United States Patent Office 3,153,812
Patented Oct. 27, 1964

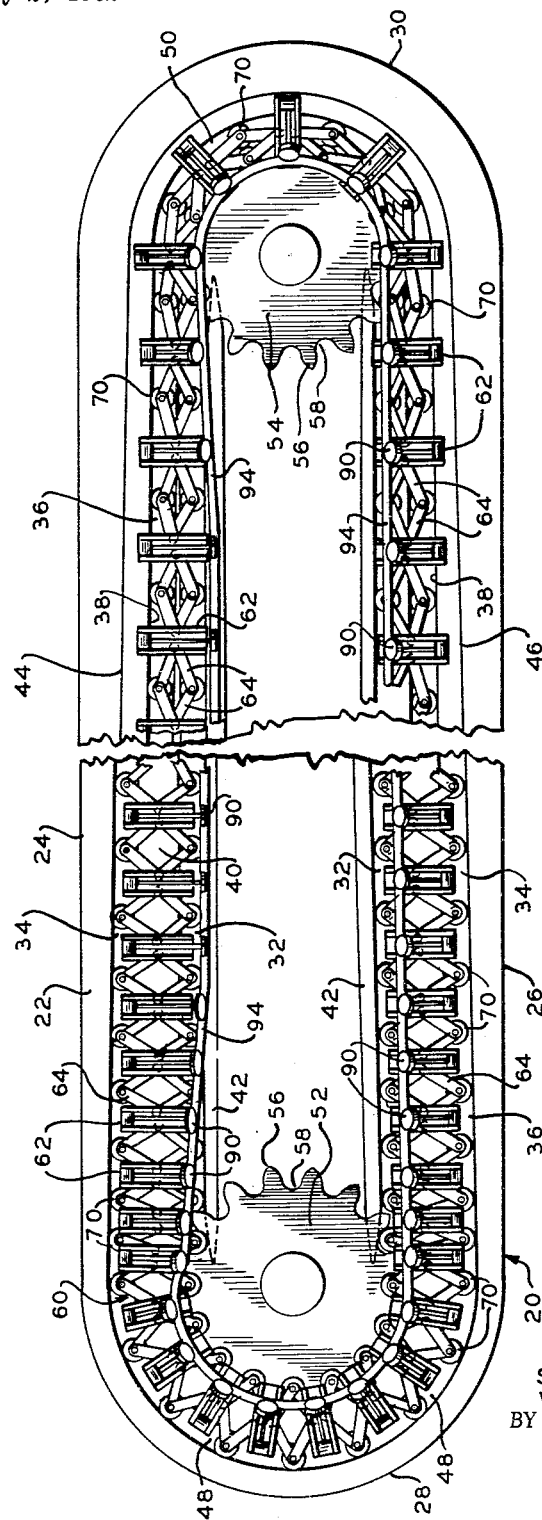

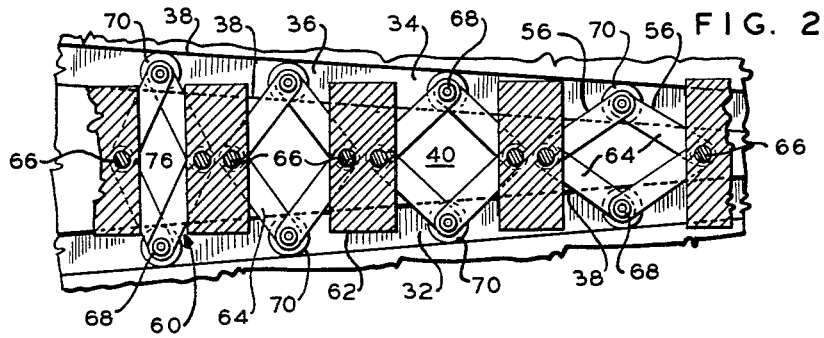
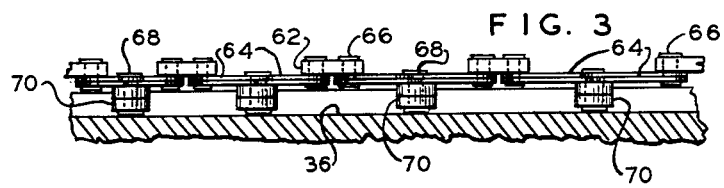
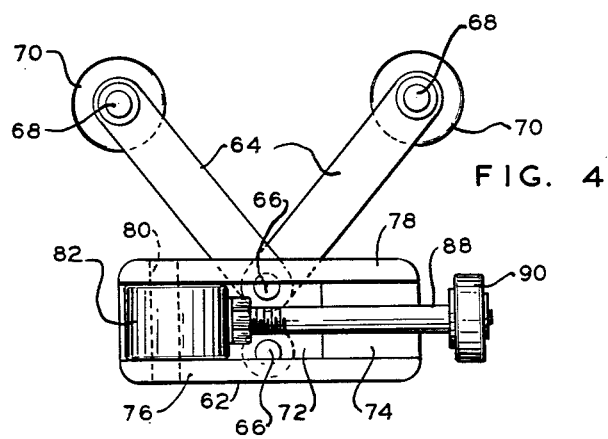
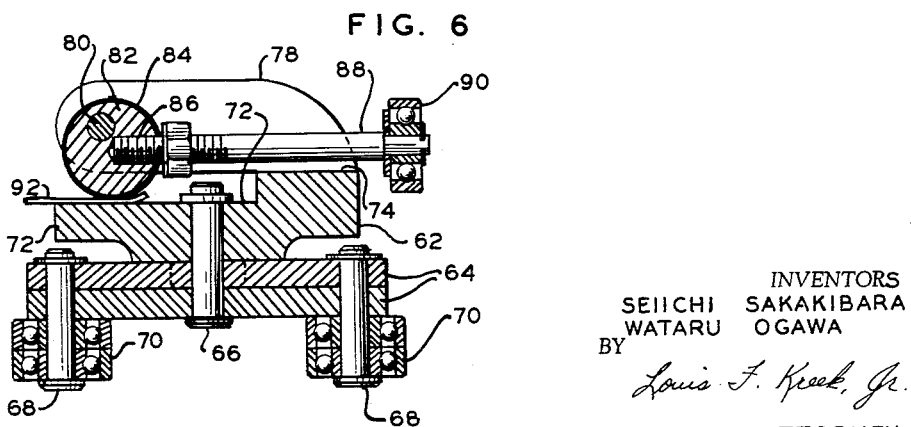
INVENTORS
SEIICHI SAKAKIBARA
WATARU OGAWA
BY
ATTORNEY

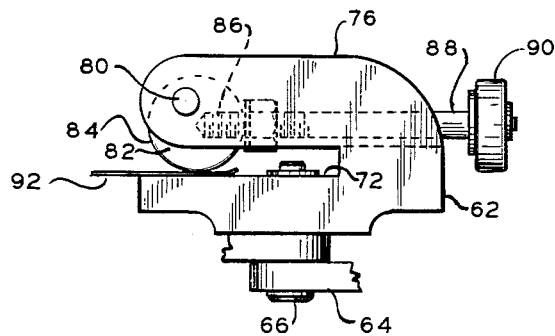
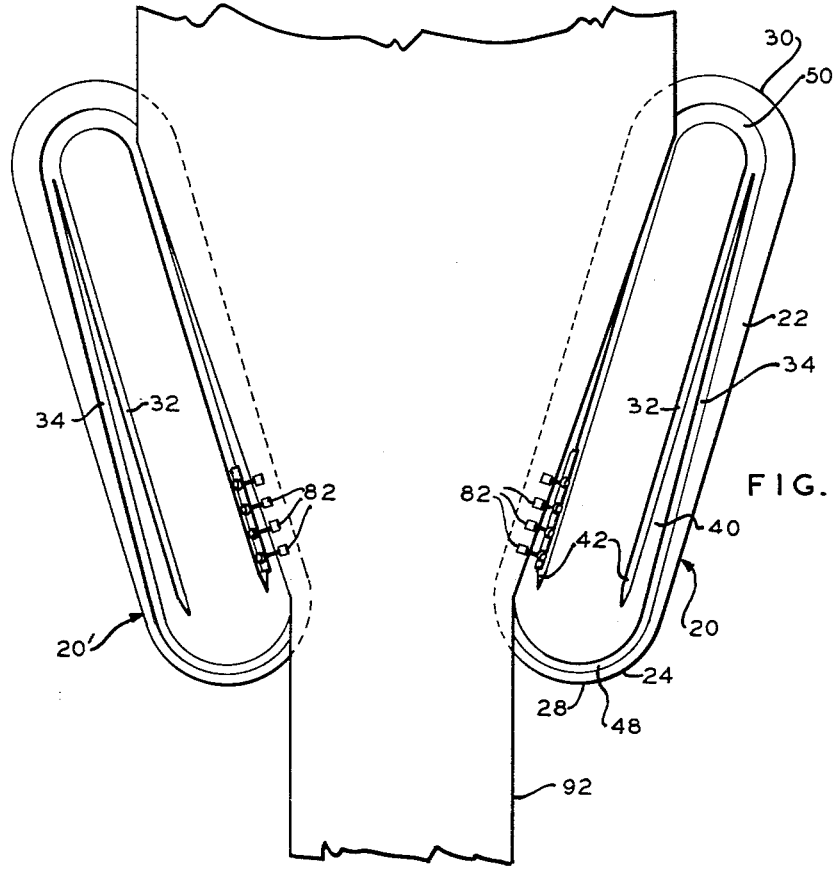

3,153,812
APPARATUS FOR SIMULTANEOUS BI-AXIAL
ORIENTATION OF PLASTIC FILM
Seiichi Sakakibara and Tooru Ogawa, Kurashiki, Japan, assignors to Kurashiki Rayon Co., Ltd., Kurashiki-shi, Japan, a corporation of Japan
Filed July 2, 1962, Ser. No. 206,629
Claims priority, application Japan June 30, 1961
2 Claims. (Cl. 18—1)

This invention relates to an apparatus for simultaneous bi-axial orientation of plastic film.

Orientation of plastic film to improve strength and other physical properties is common practice in the art. The film has generally been oriented along only one axis or sequentially, one axis at a time, along two axes at right angles to each other.

Recently, it has been suggested to orient film simultaneously along both the longitudinal and lateral axes. Simultaneous bi-axial orientation gives a film having superior properties and requires fewer processing steps than does sequential orientation along two axes.

It is an object of this invention to provide a novel apparatus for simultaneous bi-axial orientation of plastic film.

A further object is to provide an apparatus in which the amount of stress applied along each axis can be varied independently of the amount applied along the other axis.

A still further object is to provide an apparatus in which stress is increased at a substantially uniform rate along each axis.

Still a further object is to provide an apparatus including an endless expansible chain having a plurality of film clamping mechanisms for accomplishing the foregoing objects.

This invention will now be described in detail with reference to the accompanying drawing, in which:

FIG. 1 is a top plan view of the film orientation apparatus of this invention.

FIG. 2 is a fragmentary top plan view, on a larger scale than FIG. 1, showing the expansible link mechanism in detail, with the clamping mechanism removed.

FIG. 3 is a side elevation, partly in section, of the portion of the apparatus shown in FIG. 2.

FIG. 4 is a top plan view showing in detail the clamping mechanism of this invention.

FIG. 5 is a side elevation view of the clamping mechanism.

FIG. 6 is a side elevation, generally in section of the clamping mechanism shown in FIG. 4.

FIG. 7 is a schematic view showing treatment of a plastic film with the apparatus of this invention.

Referring to FIGS. 1, 2, and 3, wherein a preferred form of the apparatus is shown, the apparatus consists of a pair of frames, one of which is designated as 20 and described in detail. The two frames are mirror images. As shown in FIG. 1, frame 20 is generally oblong in shape, having top surface 22, which has two long straight portions 24 and 26 of substantial length, and two semi-circular end portions 28 and 30. Top surface 22 is supported by a suitable structure such as posts or girders not shown. Top surface 26 contains a pair of grooves or guide tracks 32 and 34. Each guide track consists of a flat bottom portion 36 and a pair of vertical side walls 38. Inside track 32 is adjacent to the inside edge of top surface 22. The two tracks 32 and 34 are separated by center portion 40 of top surface 22. Narrow flanges 42 separates inside track 32 from the inside edge of the apparatus along straight portions 24 and 26. These flanges terminate at points near ends 28 and 30 of frame 20. Tracks 32 and 34 have straight portions 44 and 46 of substantial length corresponding to straight portions 24 and 26 respectively of the frame. At least one of the two guide tracks must be endless and continuous in order to provide an enclosed path of the endless expansible chain as hereinafter described. In the embodiment shown, outside track 34 is endless, having straight portions 44 and 46 as previously noted and semi-circular end portions 48 and 50 corresponding to the semi-circular end portions 28 and 30, respectively, of frame 20. Bottom portion 36 and outside wall 38 of inside track 32 form a continuous enclosed path, but the inside wall of inside track 32 and the adjacent flange 42 are cut away at ends 28 and 30.

Tracks 32 and 34 are disposed at a small acute angle with respect to each other along straight portions 44 and 46, with the apex of the angle (i.e., the point of convergence if the tracks were extended) located beyond end 30. Tracks 32 and 34 are closer together at end 30 than at opposite end 28.

Drive wheels 52 and 54 are provided at either end of frame 20. These drive wheels have teeth 56 and recesses 58 therebetween, for engaging the expansible chain as will be hereinafter explained. A portion of teeth 56 on each drive wheel are situated above the semi-circular end portions of inside track 32.

Supported on guide tracks 32 and 34 is an endless expansible chain 60 comprising a plurality of film clamping mechanisms 62 connected by a plurality of links 64. These film clamping mechanisms 60 are disposed transversely to guide tracks 32 and 34. There are four links in a lazy tong arrangement between each two successive clamping mechanisms 62. Each link is pivotally connected at one end to the adjacent clamping mechanism 62 by a hinge pin 66, and is pivotally connected at the other end to an adjacent link by a roller pin 68. Roller pins 68 ride on the bottom surfaces 36 of guide tracks 32 and 34. Also mounted on roller pins 68 are roller bearings 70 which contact side walls 38 of guide tracks 32 and 34.

The distance between successive clamping mechanisms 62 is smallest adjacent end 28, when the distance between guide tracks 32 and 34 is greatest. As the distance between tracks 32 and 34 decreases, the distance between successive clamping mechanisms 62 increases.

The structure of the film clamping mechanisms 62 is illustrated in detail in FIGS. 4, 5, and 6. Each film clamping mechanism consists of a generally rectangular platform 72 having a raised portion 74 at one end thereof and a pair of ears 76 and 78 extending from above the raised portion 74. The raised portion 74 is at the end of platform 72 which overlies inside track 32. These ears 76 and 78 carry a pivot pin 80, on which is eccentrically mounted a clamping cylinder 82 having a cover 84 made of rubber or plastic or other suitable flexible material. Cylinder 82 and platform 72 together form a clamp for gripping the edge of a plastic film. This cylinder is internally screwed threaded at 86 to receive a stem 88 which is externally screw threaded, and which has mounted on the end opposite the cylinder 80 a roller bearing 88. When roller bearing 90 is in its lowermost position, as shown in FIG. 6, stem 88 is in a horizontal position and clamping cylinder 82 is in clamping position, thereby holding film 92 in place. When roller bearing 90 is raised, cylinder 82 is also slightly raised thereby releasing film 92. Roller bearing 90 rides on cam track 94, which is supported on frame 20 generally above the inside edge thereof. Cam track 94 is in its lowermost position along the long straight portion 24 of frame 20, and rises adjacent ends 28 and 30. Cam track 94 is elevated along long straight portion 26 of frame 20. Clamping cylinders 82 are lowered as the clamping devices 62 reach the beginning of long straight portion 24 of frame 20 adjacent end 28, thereby clamping film 92 in position.

As a clamping device 62 reaches the end of straight portion 24 adjacent end 30 of frame 20, the clamping device is opened, releasing the film.

The operation of the apparatus of this invention will now be described. Referring now to FIG. 7, there are provided a pair of frames 20, 20' disposed at an acute angle with respect to each other. Frames 20, 20' are of similar construction except that they are mirror images of each other. The feed ends 28, 28' are closer together than the discharge ends 30, 30'. The plastic film 74 to be oriented is continuously fed to feed ends 28, 28' of frames 20, 20'. The endless chain of film clamping mechanisms 62 on frame 20 moves in a clockwise direction, and the corresponding endless chain of clamping mechanisms 62' moves in a counterclockwise direction. Clamping cylinders 82 engage the film along either edge thereof at a point near the feed ends 28, 28' and release it at a point near the discharge ends 30, 30'. Lateral orientation of the film is obtained by the divergence between frames 20 and 20' as the film moves toward the discharge end of the apparatus. Longitudinal orientation is obtained as previously indicated by the increasing distance between successive clamps 50 as the film moves toward the discharge end.

The degree of orientation in either direction can be varied independently of the degree of orientation in the other direction. To change the degree of longitudinal orientation, guide tracks 32 and 34 can be set at a larger or smaller angle with respect to each other so that they converge more rapidly or more slowly, or the angle between links 64 and clamping mechanisms 62 can be changed by use of links of a different length. The extent of lateral orientation is governed by the angle between frames 20 and 20'.

Various modifications can be made from the illustrated embodiment without departing from the invention. For instance, frames 20 and 20' can be dispensed with, leaving only a pair of guide tracks 32 and 34 and supporting structure therefor on either side of the film to be oriented. Guide tracks 32 and 34 must have one straight portion 44, so that both longitudinal and lateral stress will be imparted to the film at a uniform rate. However, it is not necessary that the remainder of tracks 32 and 34 be straight; portion 46 is straight for convenience. Other modifications can also be made without departing from this invention.

It will be seen that the apparatus according to the present invention provides a simple and efficient means for simultaneously orienting a plastic film in both the longitudinal and the transverse direction. Various plastic films, such as polyethylene, polypropylene, polystyrene, polyethylene terephthalate, and polyvinyl alcohol, to mention only a few, can be oriented using the apparatus of this invention.

We claim:

1. Apparatus for simultaneous bi-axial orientation of plastic film comprising,
    (A) a first plurality of plastic film clamping mechanisms adapted to engage one side edge of a plastic film during the simultaneous bi-axial orientation of said plastic film and a second plurality of plastic film clamping mechanisms adapted to engage the other opposite side edge of said plastic film during said simultaneous bi-axial orientation of said plastic film;
        said first plurality of film clamping mechanisms and said second plurality of film clamping mechanisms mounted on separate endless expansible chains whereby the distance between any two adjacent film clamping mechanisms on either of said chains may be varied;
        each of said plastic film clamping mechanisms comprising,
            (1) a flat level surface, and
            (2) a clamping cylinder pivotally mounted for rotation about an eccentric axis above said flat level surface whereby rotation of said cylinder about said eccentric axis permits the clamping of said edge of said plastic film between the lower portion of said cylinder and said flat level surface;
    (B) each of said separate endless chains comprising a plurality of links and a plurality of said clamping mechanisms joined to provide said endless chain;
        said plurality of links being joined in groups of four links in lazy tong arrangement between each two adjacent film clamping mechanisms mounted on said chain;
        each of said group of four links having only two links commonly joined by first pivot means to one of said adjacent clamping mechanisms and having only the other two adjacent links commonly joined by second pivot means to the other said adjacent clamping mechanism;
        one of said two links being commonly joined by third pivot means to one of said other two adjacent links and the other one of said two links being commonly joined by fourth pivot means to the other one of said other two adjacent links;
        each of said third and fourth pivot means carrying separate adjacent roller bearing means;
    (C) two pairs of guide tracks wherein at least one track in each pair is endless and continuous;
        each pair of said guide tracks containing a straight portion of substantial length;
        said straight portions in said two pairs of tracks being disposed at an acute angle with respect to each other;
        said roller bearing means of each said endless chain contacting said guide tracks and adapted for advancement along said guide tracks;
        said two guide tracks in each pair being disposed at an acute angle with respect to each other in said straight portion;
        said two tracks in said straight portion providing the maximum distance between said adjacent roller bearing means at the plastic film feed end of said straight portion and said straight portion tracks converging at the plastic film discharge end of said straight portion whereby the distance between said adjacent roller bearing means is at a minimum and whereby the distance between said adjacent clamping mechanisms is at the maximum possible extent;
    (D) a drive wheel at said feed end and a drive wheel at said discharge end contacting said bearing means whereby said drive wheels are capable of advancing said bearing means and said clamping mechanisms and said chain along said straight portion from said feed end to said discharge end and whereby the distance between adjacent clamping mechanisms becomes greater during said advancement along said straight portion;
    (E) and means for maintaining said clamping cylinders in film clamping position during said advancement of said clamping mechanisms along said straight portion.

2. An endless chain apparatus with plastic film clamping mechanisms for simultaneous bi-axial orientation of plastic film comprising,
    (A) a plurality of plastic film clamping mechanisms adapted to engage opposite side edges of a plastic film during the simultaneous bi-axial orientation of said film;
        said plastic film clamping mechanisms mounted on endless expansible chains whereby the distance between adjacent film clamping mechanisms on each of said chains may be varied;
        each of said clamping mechanisms comprising,
            (1) a flat level surface, and (2) a clamping cylinder pivotally mounted for rotation about an eccentric axis above said flat level surface whereby rotation of said cylinder about said eccentric axis permits the clamping of said edge of said plastic film between the lower portion of said cylinder and said flat level surface;

(B) each of said endless expansible chains comprising a plurality of links and a plurality of said plastic film clamping mechanisms whereby said links are joined to each other and joined to said clamping mechanisms in groups of four links in lazy tong arrangement between two adjacent clamping mechanisms;

each of said clamping means having a separate first pivot means and a separate second pivot means;

each two links of a said group of four links being commonly joined by a said first pivot means to one of said two adjacent clamping mechanisms;

said other two links of said group of four links being commonly joined by a said second pivot means to the other one of said two adjacent clamping mechanisms;

one of said two links being commonly joined by third pivot means to one of said other two links and the other one of said two links being commonly joined by fourth pivot means to the other one of said other two links;

each of said third and fourth pivot means carrying separate adjacent roller bearing means;

(C) guide track means, for each of said endless chains, adapted to contact said bearing means;

(D) drive wheels, for each of said endless chains, adapted to contact said bearing means and adapted to advance said endless chains along said guide track means during said orientation of said plastic film;

(E) and means for maintaining said clamping cylinders in film clamping position during said orientation of said plastic film.

References Cited in the file of this patent
UNITED STATES PATENTS

| | | |
|---|---|---|
| 860,993 | Riley | July 23, 1907 |
| 1,096,249 | Kessler | May 12, 1914 |
| 1,560,494 | Trester | Nov. 3, 1925 |
| 2,923,966 | Tooke et al. | Feb. 9, 1960 |
| 3,000,073 | Zuck et al. | Sept. 19, 1961 |
| 3,014,234 | Koppehele | Dec. 26, 1961 |
| 3,046,599 | Nicholas et al. | July 31, 1962 |

FOREIGN PATENTS

| | | |
|---|---|---|
| 1,111,812 | Germany | July 27, 1961 |